United States Patent
Stambler et al.

(10) Patent No.: US 10,131,446 B1
(45) Date of Patent: Nov. 20, 2018

(54) ADDRESSING MULTIPLE TIME AROUND (MTA) AMBIGUITIES, PARTICULARLY FOR LIDAR SYSTEMS, AND PARTICULARLY FOR AUTONOMOUS AIRCRAFT

(71) Applicant: Near Earth Autonomy, Inc., Pittsburgh, PA (US)

(72) Inventors: Adam Stambler, Pittsburgh, PA (US); Lyle J. Chamberlain, Pittsburgh, PA (US); Sebastian Scherer, Pittsburgh, PA (US)

(73) Assignee: NEAR EARTH AUTONOMY, INC., Pittsburgh, PA (US)

( * ) Notice: Subject to any disclaimer, the term of this patent is extended or adjusted under 35 U.S.C. 154(b) by 147 days.

(21) Appl. No.: 15/211,382

(22) Filed: Jul. 15, 2016

Related U.S. Application Data (60) Provisional application No. 62/193,344, filed on Jul. 16, 2015.

(51) Int. Cl.
   *B64D 45/00* (2006.01)
   *H04B 1/3822* (2015.01)
   (Continued)

(52) U.S. Cl.
   CPC ............ *B64D 45/00* (2013.01); *B64D 47/08* (2013.01); *G01C 21/165* (2013.01); *G01S 13/12* (2013.01);
   (Continued)

(58) Field of Classification Search
   None
   See application file for complete search history.

(56) References Cited

U.S. PATENT DOCUMENTS

| | | | | |
|---|---|---|---|---|
| 3,680,086 A | * | 7/1972 | Valstar | G01S 1/02 342/158 |
| 5,034,751 A | * | 7/1991 | Miller, Jr. | H01Q 1/28 244/2 |

(Continued)

FOREIGN PATENT DOCUMENTS

CN          104297743 A   *   1/2015

OTHER PUBLICATIONS

Lu; Machine translation of CN-104297743-A; Jan. 2015; espacenet.com (Year: 2015).*

(Continued)

*Primary Examiner* — David P. Merlino
(74) *Attorney, Agent, or Firm* — K&L Gates LLP

(57) ABSTRACT

An apparatus comprises a time-of-flight ranging sensor that scans in two or more directions relative to the apparatus over a series of scanning cycles. A processor computes, and to communicates to the time-of-flight ranging sensor, a pulse repetition rate (PRR) for the time-of-flight ranging sensor for each of the two or more directions based on information about surrounding terrain of the apparatus and a sensor pointing schedule for the time-of-flight ranging sensor that indicates directions that the time-of-flight ranging sensor is scheduled to point at time during the scanning cycles. In addition or lieu of computing the PRR, the processor(s) matches returns from pulses of the time-of-flight ranging sensor to the pulses probabilistically based on a current map of the vehicle's surroundings and scan coherence analysis for shapes in the returns. The current map can then be updated based on the matched returns for the next iteration.

11 Claims, 5 Drawing Sheets

(51) Int. Cl.
    *G05D 1/10*     (2006.01)
    *B64D 47/08*    (2006.01)
    *G01C 21/16*    (2006.01)
    *G01S 13/22*    (2006.01)
    *G01S 17/10*    (2006.01)
    *G01S 17/93*    (2006.01)
    *G01S 13/93*    (2006.01)
    *G01S 17/89*    (2006.01)
    *G01S 13/12*    (2006.01)

(52) U.S. Cl.
    CPC .......... *G01S 13/22* (2013.01); *G01S 13/9303* (2013.01); *G01S 17/10* (2013.01); *G01S 17/89* (2013.01); *G01S 17/933* (2013.01); *G05D 1/101* (2013.01); *H04B 1/3822* (2013.01)

(56) References Cited

U.S. PATENT DOCUMENTS

| | | | | |
|---|---|---|---|---|
| 9,128,190 B1* | 9/2015 | Ulrich | .................. | G01S 17/936 |
| 2006/0197936 A1* | 9/2006 | Liebman | ................. | G01S 17/42 |
| | | | | 356/5.01 |
| 2008/0272955 A1* | 11/2008 | Yonak | .................. | G01S 13/931 |
| | | | | 342/54 |
| 2014/0297116 A1* | 10/2014 | Anderson | ............ | B60G 11/265 |
| | | | | 701/37 |
| 2017/0219364 A1* | 8/2017 | Lathrop | ............... | G01C 21/206 |

OTHER PUBLICATIONS

Rieger; Resolving range ambiguities in high-repetition rate airborne light detection and ranging applications; Jul. 2012; SPIE—Jornal of applied remote sensing; vol. 6; p. 1-16; https://www.spiedigitallibrary.org (Year: 2012).*

Rieger; Range ambiguity resolution technique applying pulse position modulation in time-of-flight scanning lidar application; Jun. 2014; SPIE—Optical Engineering Journal; vol. 52(6); p. 1-12; https://www.spiedigitallibrary.org (Year: 2014).*

Arora, Sankalp, et al. "PASP: Policy Based Approach for Sensor Planning," 2015 IEEE International Conference on Robotics and Automation, May 2015.

Lu, Hao, et al., "An Automatic Range Ambiguity Solution in High-Repetition-Rate Airborne Laser Scanner Using Priori Terrain Prediction," IEEE Geoscience and remote Sensing letters, vol. 12, No. 11, Nov. 2015.

* cited by examiner

ADDRESSING MULTIPLE TIME AROUND (MTA) AMBIGUITIES, PARTICULARLY FOR LIDAR SYSTEMS, AND PARTICULARLY FOR AUTONOMOUS AIRCRAFT

PRIORITY CLAIM

The present application claims priority to U.S. provisional patent application Ser. No. 62/193,344, filed Jul. 16, 2015, having the same title and inventors as the present application, and which is incorporated herein by reference it is entirety.

BACKGROUND

Lidar systems, as well as other time-of-flight ranging sensors, face a trade off between measurement range and measurement rate due to multiple time around (MTA) ambiguity. MTA occurs when the lidar device takes measurements at a rate fast enough that previous pulses of energy may return from distant targets after successive pulses have been transmitted. This causes multiple pulses to be in the air at once. When the lidar system receiver measures a return, it does not know to which pulse the return corresponds so it cannot calculate the correct time of flight for the measurement. This means that lidar systems are constrained in how they can measure the world. They can either measure far off distances or sample the world densely. Airborne vehicles moving quickly need both as much as possible in order to perceive the world and plan safe trajectories. This problem particularly affects long-range forward and sideward scanning sensors for aircraft that scan in pitch, as the distance of targets varies greatly between terrain below the aircraft and terrain on the horizon. The potential measurement rate for the close targets suffers because the lidar system must pulse slowly to avoid MTA when pointed towards distant targets on the horizon.

One solution is to use multiple lidar systems in an aircraft, but this may not be acceptable in some aircraft applications because of size, weight, power and/or cost system budgets.

SUMMARY

In one general aspect, the present invention is directed to computer-based systems and methods for addressing MTA ambiguity for time-of-flight ranging sensors, such as a lidar system. The systems and methods of the present invention are particularly useful in autonomous vehicles, such as autonomous aircraft, where real-time ranging data is needed to guide the vehicle, although embodiments of the present invention could also be used with a fixed, stationary time-of-flight sensing apparatus. In one general aspect of the present invention, where used in a vehicle, the vehicle's on-board computer system computes a pulse repetition rate (PRR) for the time-of-flight ranging sensor, dependent on the vehicle's position and information about surrounding terrain of the vehicle, to maximize the PRR that the sensor can use without having MTA ambiguity, in order to increase the available bandwidth of the sensor. In another general aspect, the vehicle's on-board computer system matches returns from pulses of the time-of-flight ranging sensor to the pulses probabilistically based on a current map of the vehicle's surroundings and scan coherence analysis for shapes in the returns. The current map can then be updated based on the matched returns for the next iteration. These two solutions can be used together or separately.

These and other benefits of the present invention will be apparent from the description below.

FIGURES

Various embodiments of the present invention are described herein in conjunction with the following figures, wherein.

DESCRIPTION

In one general aspect the present invention is directed to computer-implemented systems and methods that increase the available bandwidth of a time-of-flight ranging sensor, such as lidar or radar sensors, by varying the pulse repetition rate (PRR) of the sensor. The PRR can be varied either continuously or in steps, for example, using information about the surrounding terrain from pre-loaded maps, combined with known state information about the aircraft from a state estimation system. In another general aspect, the present invention is related to computer-implemented systems and methods that resolve MTA ambiguity with probabilistic modeling. These systems can be used together or they could be used separately. In particular, they could be used together or individually in a fixed, stationary time-of-flight sensing apparatus or in a moving vehicle, such as an aircraft. For example, the inventive systems could be used in an autonomous aircraft, and that is the context in which the systems are described below. Therefore, before explaining these systems in detail, a general description of an autonomous aircraft is provided.

Figure 1:
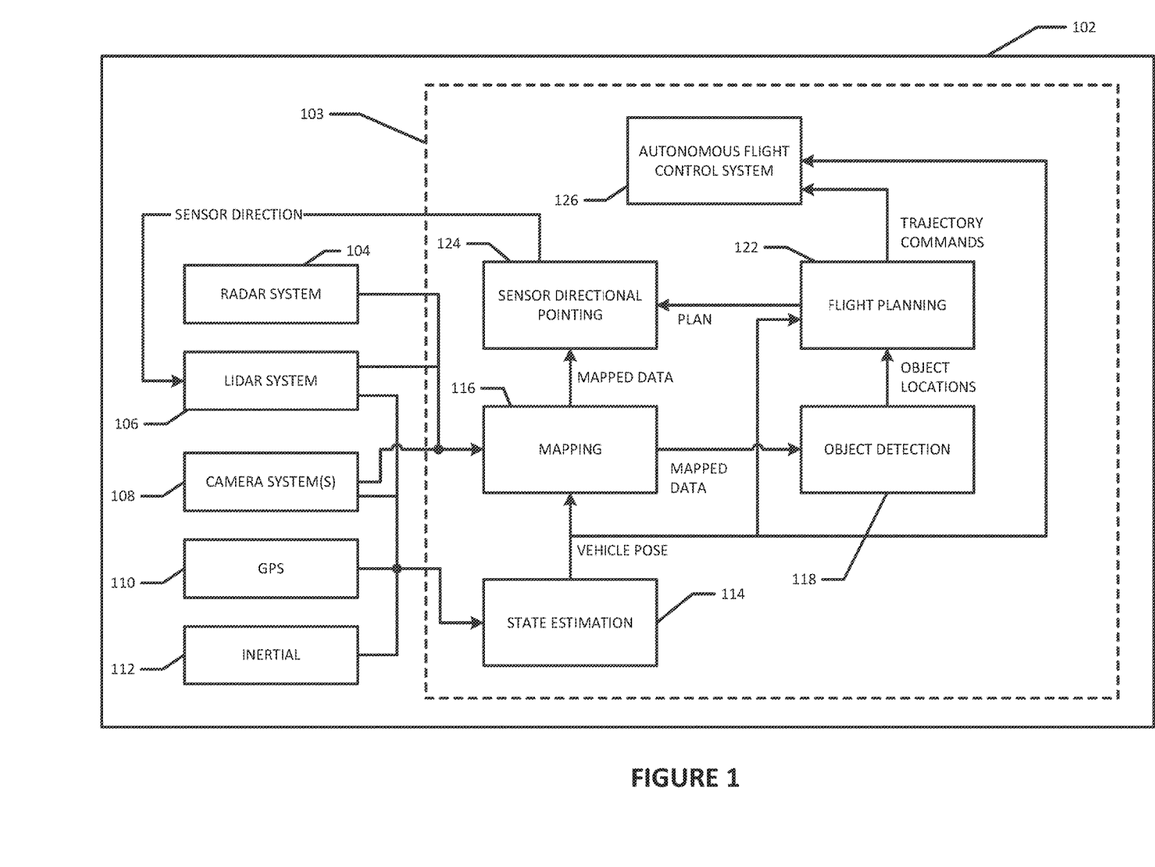
FIG. 1 is a block diagram of an on-board computerized flight system according to various embodiments of the present invention.

FIG. 1 schematically depicts an example of an on-board, computerized flight system 102 that can be employed in connection with different kinds of aircraft (e.g., airplanes, helicopters, or other vehicles capable of flight) for autonomous, semi-autonomous, or piloted operation. As shown, the flight system 102 includes various components which provide data to an on-board computer system 103 of the craft regarding its current operating conditions and its surrounding environment. A radar system 104 transmits from the craft high-frequency electromagnetic waves in periodic pulses which are reflected from various objects in the environment around the craft and received back ("returns") by the radar system 104 to determine the range, angle and/or velocity of the detected objects. A lidar system 106 is similar conceptually except that it emits pulses of laser light or a focused beam of light to detect objects in the environment. In one embodiment, the lidar system 106 may comprise one or more channels that scan side-to-side in front of the aircraft.

The pointing angle of the lidar system (e.g., up and down) can be controlled and the lidar scanner 106 may have a range of up to several kilometers. A camera system 108 having one or more cameras may also be employed by the system 102 to capture digital image data, for the environment surrounding the craft during flight. Also, a global positioning system or GPS system 110 may be provided for locating coordinates of the craft within a given space, such as latitude and longitude coordinates.

In certain embodiments, an inertial navigation system 112 (INS) may also be used for aiding navigation. The INS 112 may use measurements provided by accelerometers and gyroscopes, for example, to track the position and orientation of a craft relative to a known starting point, orientation and velocity. As such, the INS 112 may include some combination of orthogonal rate gyroscopes, orthogonal accelerometers for measuring linear acceleration, and/or motion-sensing devices. The INS 112 may be provided with initial position and velocity data from another source, such as the GPS system 110 for example, and thereafter compute updated position and velocity data by integrating information received from its motion sensors. The GPS system 110 and the INS system 112 can be programmed to operate collaboratively as complementary systems. In certain embodiments, a combined GPS/INS systems can be programmed to use GPS satellite signals to correct or calibrate a solution from an INS. The benefits of using GPS with INS also include providing position and angle updates at an enhanced rate than using GPS alone. Particularly with regard to dynamic vehicles such as an aircraft, the INS system 112 can fill in data gaps between detected GPS positions, for example. Also, if the GPS system 110 loses its signal, the INS system 112 can continue to compute position and angle data during the lost GPS signal period.

The on-board computer system 103 and the various sensor systems 104-112 are loaded on-board or otherwise included on, or affixed to, the aircraft. All of these multiple sensor systems collect data over time as the aircraft flies or otherwise travels or hovers over the terrain below and the data are time stamped so that the state estimate of the aircraft at each time stamp can be estimated, with the time stamped state estimates be used to generate a 3D mapping of the aircraft's surrounding environment for navigational purposes.

The on-board computer system 103 may comprise a number of software modules for performing various functions necessary for flight operations, including, among others, a state estimation module 114, a mapping module 116, an object detection module 118, a flight planning module 122, a sensor directional pointing module 124, and an autonomous flight control system 126. The on-board computer system 103 may comprise one or more, preferably multi-core, processors and one or more memory units. The memory units may comprise software or instructions that are executed by the processor(s), including the above-mentioned software modules. The memory units that store the software/instructions that are executed by the processor may comprise primary computer memory, such as RAM or ROM. The software may also be stored in secondary computer memory, such as hard disk drives and solid state drives.

Based on input data from the various sensor systems 104-112, the state estimation module 114 computes a multi-dimensional state estimate of the vehicle/aircraft on an ongoing basis as the vehicle moves. The state estimation module 114 can use a Kalman filter, for example, to estimate values for 6, 9, 12 or preferably 15 degrees of freedom (DOF) for the vehicle ($x$, $y$, $z$, $\phi$, $\theta$, $\Phi$, $\dot{x}$, $\dot{y}$, $\dot{z}$, $\dot{\phi}$, $\dot{\theta}$, $\dot{\psi}$, $\ddot{x}$, $\ddot{y}$, $\ddot{z}$), where x, y and z refer to 3D-coordinates for the vehicle, $\phi$, $\theta$ and $\psi$ refer to the three degrees of rotational freedom for the vehicle, one overhead dot denotes the first derivative of the associated variable, and two overhead dots denotes the second derivative of the associated variable.

Information from the state estimation module 114, along with data from the radar system 104 and the lidar system 106, can be communicated to the mapping module 116 of the on-board computer system 103, to generate continuously updated geo-registered point clouds. The output from the camera system(s) 108 may also be feed to the mapping module 116 to aid in generating the point clouds. In certain embodiments, the mapping module 116 can be programmed to generate the point clouds by registering data it receives into a global space by determining where each data measurement it receives belongs in that 3D space. Data mapped by the mapping module 116 can then be communicated to the object detection module 118 of the on-board computer system 103 for determination of which mapped data represent an "object" of concern (e.g., wires, trees, buildings, bridges, etc.) and which mapped data do not comprise an object of concern. For example, the object detection module 118 may employ one or more different kinds of clustering algorithms for determining the presence of a curve shape (for example a catenary shape) which may be a power transmission line or a cable in the path of the craft. In various embodiments, the object detection module 118 can be programmed to determine and associate a location within the global space for each of the detected objects. Also, the object detection module 118 can filter out spurious data, such as caused by obscurants, such as dust, snow, etc. Also, the object detection module 118 could generate a dense 3D probabilistic representation of the environment for the vehicle, such as a 3D evidence grid in which every cell in the grid reports the likelihood that there is an object in that cell, regardless of whether the object is classified as a particular type of object or not.

The flight planning module 122 of the on-board computer system 103 may be programmed to receive data input from the object detection module 118 and/or the state estimation module 114 to continuously calculate (e.g., update) a flight path for the craft to follow during its flight. In the context of a fully autonomous aircraft, for example, the flight planning module 122 may automatically determine, and continuously update, a flight path or trajectory for the aircraft to follow with little or no human interaction. In various embodiments, the sensor directional pointing module 124 of the on-board computer system 103 may be programmed to receive flight plan data from the flight planning module 122 and/or map data from the mapping module 116. The sensor directional pointing module 124 operates to direct one or more of the sensors (e.g., radar, lidar, and/or camera systems) in the direction where the craft is planning to travel in accordance with the flight plan. That is, the radar, lidar, and/or camera systems may each include mechanized systems for controlling in which directions the systems point in capturing data. For example, they can scan across the area in the impending flight path of the aircraft, including pointing toward the landing zone to do the terrain evaluation for a landing site. The sensor directional pointing module 124 can provide a feedback loop for the process of obtaining updated data regarding objects which may arise in the path of the craft as it travels through an environment along the previously determined flight path, or in the landing zone.

In various embodiments, the autonomous flight control system 126 of the on-board computer system 103 receives data input from the flight planning module 122 and/or the state estimation module 114. The flight control system 126 may be programmed to execute the movement and general operation of the craft along the calculated flight plan, among performing other tasks. That is, output from the flight control system 126 can be used to control the propulsion and steering systems of the aircraft. The propulsion system(s) may include engines, motors, propellers, propulsive nozzles, and rockets, for example. The steering systems may include propeller blade pitch rotators, rudders, elevators, ailerons, etc. More details about exemplary on-board computer system can be found in U.S. patent application Ser. No. 15/091,661, filed Apr. 16, 2016, and Ser. No. 15/152,944, filed May 12, 2016, both of which were filed on the present applicant and both of which are incorporated herein by referenced in their entirety.

Turning now to more specific aspects of the present invention, the on-board computer 103 can be programmed with software to vary the PRR of the craft's ranging sensor systems, such as the lidar and/or radar systems 104, 106 to increase sensor bandwidth without creating MTA ambiguities. The description below refers to a "range sensor" with the recognition that the "range sensor" can be the lidar sensor 106, the radar sensor 104, or both, and/or any other time-of-flight range sensor system that is installed on the vehicle. For example, the range sensor could be a pivoting, forward- and downward-looking gimbaled lidar system 106 that is affixed or otherwise connected to the aircraft and that executes at least two general tasks in an aircraft setting: (i) scanning the horizon long-range to detect obstacles during forward flight and (ii) scanning the ground at shorter ranges to survey potential landing sites. That is, the lidar system may pivot up and down so that over one scanning cycle, the lidar system spends a first portion of the cycle time period pointed toward the horizon and a second portion of the cycle time period pointed toward the ground below the aircraft as well as locking of directions therebetween. The long-range horizon detection generally must operate at a lower PRR than when pointed at the ground since objects on the horizon will typically be further away than the ground. When scanning the horizon, the sensor could be pointed at long-distance objects that would cause MTA ambiguities, while the short range, ground survey scanning needs much higher PRR frequencies in order to quickly survey the nearby ground terrain, such as when evaluating a potential landing site.

Figure 2:
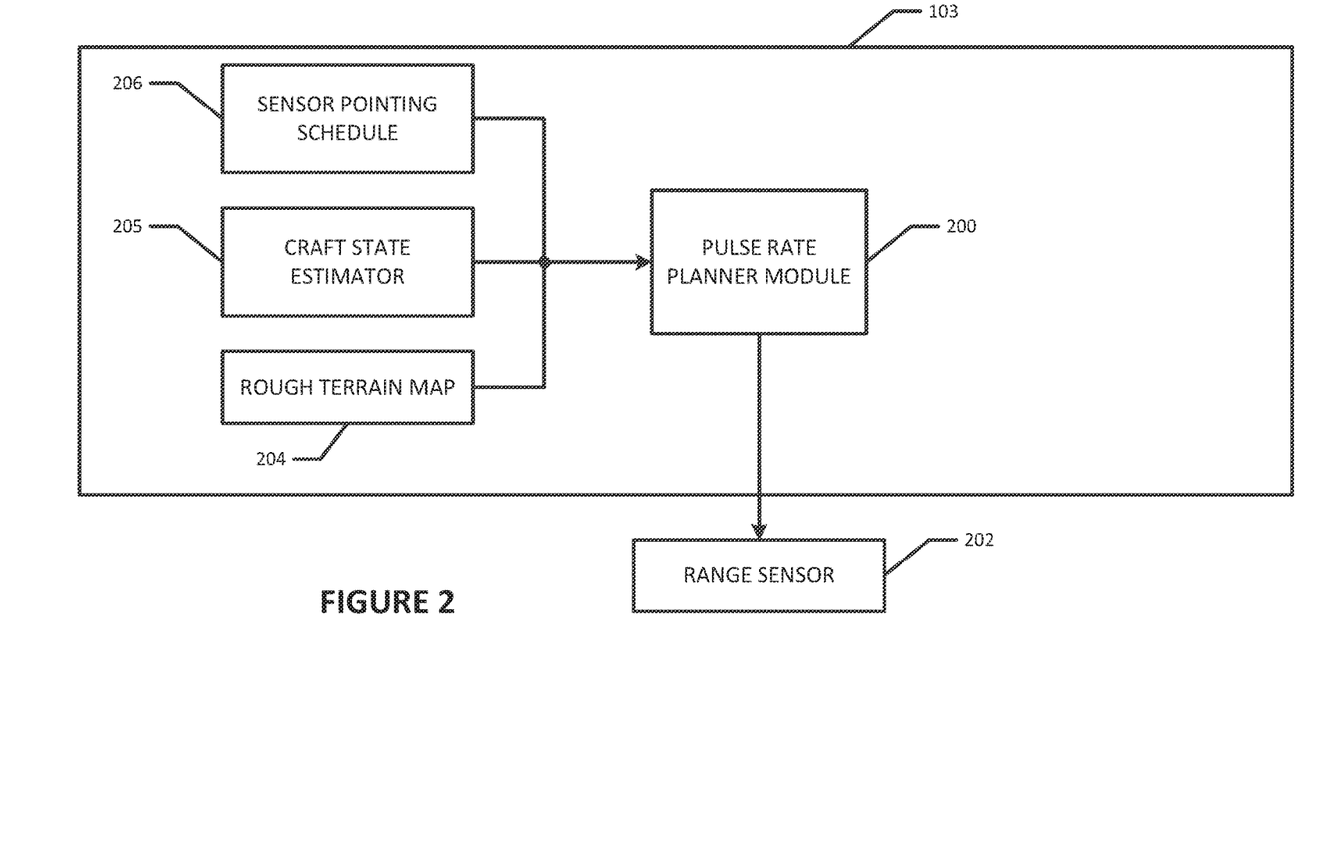
FIG. 2 is a block diagram of the on-board computer system of FIG. 1, showing a pulse rate planner module thereof, according to various embodiments of the present invention.

To that end, in one embodiment as shown in FIG. 2, the on-board computer system 103 may also comprise a Pulse Rate Planner software module 200 that determines the appropriate PRR settings for the range sensor 202 (e.g., the lidar system 106 or the radar system 104). To do this, the Pulse Rate Planner module 200 can calculate the ranges that the range sensor 202 (e.g., the radar or lidar sensors 104, 106) will be required to measure using input from: (i) a rough terrain map 204 (either pre-existing, or created by the range sensor 202 at the longest range settings); (ii) the current aircraft state 205 (position, velocity, attitude, etc., which can be determined by the state estimation module 114); and (iii) a "sensor pointing schedule" 206, which can be effectively a list of pointing directions (e.g., horizon or ground or in-between) and times that the range sensor 202 will be asked to point in such directions. The pointing directions and times vary over the course of a flight and can be determined by the sensor directional pointing module 124 based on the flight plan and the map of the vehicle's surroundings. That is, for example, as the craft approaches its desired landing site, its scans of the ground may increase relative to its scans of the horizon. The terrain map 204 can be stored in a computer memory of the on-board computer system 103 and can comprise a high-resolution 3D-representation of the terrain.

The Pulse Rate Planner module 200 can generate a schedule of expected ranges for the range sensor at future times given these three inputs. The range sensor 202 can then be controlled to emit its pulse according to the PRR. By way of example, the Pulse Rate Planner module 200 might determine that the expected range to objects on the horizon is 5 km, whereas the expected range for objects on the ground is 1.5 km. The Pulse Rate Planner module 200 can then calculate the maximum PRR that the range sensor 202 can use at the various stages of its scanning cycle that reduce or minimize MTA problems. In the above example, the maximum PRR would be less for time periods where the sensor is pointed toward the horizon than the time periods where the sensor is pointed toward the ground because the expected ranges are greater for the horizon scanning than for the ground scanning. Since the Pulse Rate Planner module 200 knows at what future times the sensor 202 is to be pointed at the horizon versus the ground versus other possible directions from the sensor pointing schedule 206, the Pulse Rate Planner module 200 can calculate the maximum PRR for each of future time points based on the expected ranges for each of the directions.

In calculating the maximum PRR, the Pulse Rate Planner module 200 preferably takes into account the characteristics of the particular range sensor 202 in use. That is, for example, ranges sensors vary in the ability to change PRR. Some can do it continuously, some discretely, and they can vary how long the switch takes. The Pulse Rate Planner 200 can ensure that the PRR changes fulfill both the requirements of the range sensor and the range schedule. For example, the Pulse Rate Planner 200 preferably does not increase or decrease the PRR in a time frame faster than the range sensor 202 can increase or decrease its PRR.

Currently, most ranging devices on aircraft are used either for survey (ground scanning), or collision prediction/avoidance (horizon scanning), but not for both. To solve the MTA problem in survey applications, the typical solution is to set the measurement rate ahead of time, and then plan the flight path of the aircraft to ensure that the ranges to the terrain fall within the correct range. This limits the aircraft's available maneuvering space. Another method is to statistically measure groups of measurements and infer which MTA zone to assign them to. This requires multiple measurements of the same target, which makes some objects such as wires harder to detect. In contrast, the Pulse Rate Planner module 200 of the present invention can determine the appropriate PRR for the range sensor depending on its particular task at the time (e.g., horizon versus ground scanning), thereby allowing the range sensor to operate at the maximum bandwidth that the sensor is capable of for a given target area while greatly reducing/eliminating MTA effects, thereby allowing the sensor to detect small objects that do not give a lot of returns.

In addition to or in lieu of varying the PRR, the MTA ambiguities can be addressed probabilistically in various embodiments. Consider for the sake of example a two-dimensional lidar system 106 that nods (pivots), from directly below the craft to the horizon, while scanning from left to right, using a laser pulsing at a spinning mirror which controls the angle in the 2-D plane that is sensed. As the laser scans, the rays are georegistered using a localization system. The MTA ambiguity of the 3D measurement can be modeled as a part of the sensor noise. This ambiguity shows up as two components. There is a unimodal increase in angular uncertainty and a multi-modal increase in range uncertainty.

These uncertainties can be merged in a maximum likelihood framework with the prior maps and the likelihood of the scanned shapes to perform an update on the maps. The probability distribution over all possible maps can be maintained as a particle filter or similar non parametric distribution.

The lidar measurement uncertainties are a function of the laser pulse rate and the 2-D mirror angular velocity rate. The angular uncertainty is due to the lack of correspondence between laser pulses and returns. Due to MTA, there is a probability distribution over prior pulses to which the return could belong. For example, if the measurement time for the farthest sensible distance is double the pulse rate, then this angular uncertainty spans the angle swept by the mirror during the prior two pulses. For range uncertainty, there is a mode for each range to which the measurement could alias given each pulse/return correspondence. Each mode has the normal sensor noise without MTA ambiguity. Additionally, the range uncertainty is a function of mirror angular rate. This angular rate restricts the likely range of the possible modes by physically limiting the distance for a return. The mirror can spin far enough such that any return beyond a distance misses the laser receiver because the mirror points in another direction.

Figure 5:
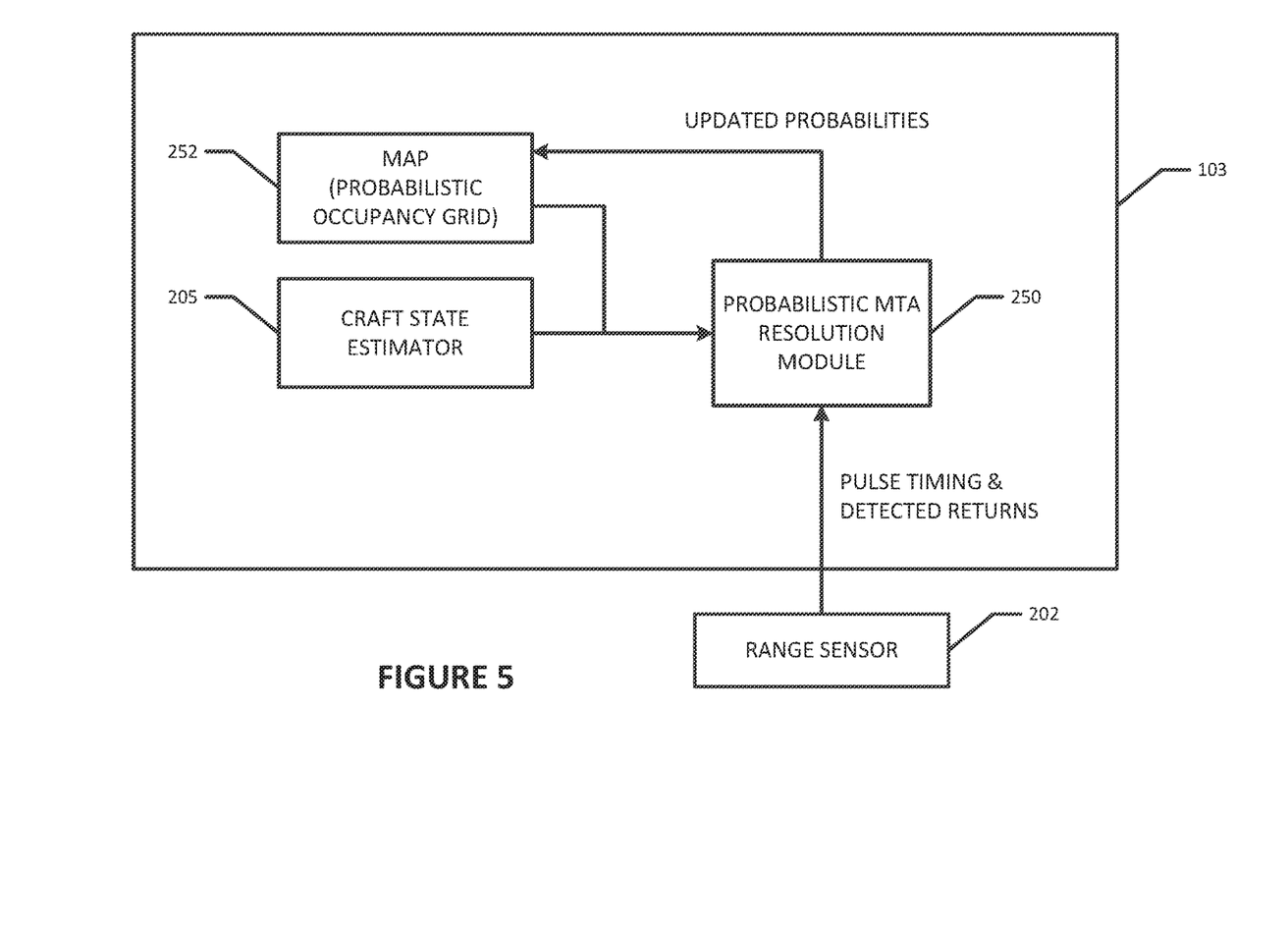
FIG. 5 is a block diagram of the on-board computer system of FIG. 1, showing a probabilistic MTA resolution module thereof, according to various embodiments of the present invention.

FIG. 5 is a diagram of the on-board computer system 103 with a probabilistic MTA resolution module 250 for resolving the MTA ambiguities between the pulses and detected returns of the range sensor 202 according to various embodiments. The probabilistic MTA resolution module 250 can use a prior model for expected range that is based on its map, built up to that moment in time ("the current map") 252. The current map 252 can include a probabilistic occupancy grid (possibly multi-resolution or octree based) that is generated by the probabilistic MTA resolution module 250 or some other module of the on-board computer system 103, such as the mapping module 118. A probabilistic occupancy grid can represent the three-dimensional volume around the vehicle, with each cell of the grid indicating the likelihood of an object being in the 3D location corresponding to the cell. The "current map" 252 can be initialized by a digital elevation model (DEM) along with a set of range measurements at the start of the flight. As such, the on-board computer system 103 could include a DEM database or server that stores the DEMs for the projected flight path of the vehicle, along with the corresponding range information for the DEMs. The initial scans can use the full, longest distance sensing to create a perfectly known volume in the system's map. Each subsequent measurement can be analyzed based on its likelihood given the prior map. The conditional likelihood of each ambiguous pulse/return pair given the map is the likelihood that a ray could have traversed each cell in-between the emitter of the sensor and the potential measurement point.

Additionally, the likelihood of each point in the grid can be based on the likelihood of the object it scans. The pulse/return pairs which generate scans with structural coherence are more likely than scans of scattered points in space, thousands of feet above ground. Structure coherence can be evaluated with algorithms such as Tensor Voting (see Mordohai, P. & Medioni, "Tensor Voting: A Perceptual Organization Approach to Computer Vision and Machine Learning," Synthesis Lectures on Image, Video, and Multimedia Processing, Vol. 2, pp. 1-136, 2006) or algorithms which recognize arbitrary shapes in the point cloud. Scans with salient planes, curved surfaces, or wires are more likely than scattered points. Recognition can occur using complementary sensors such as visible light cameras or hyperspectral imagers that add additional features to each measured point.

Figure 3:
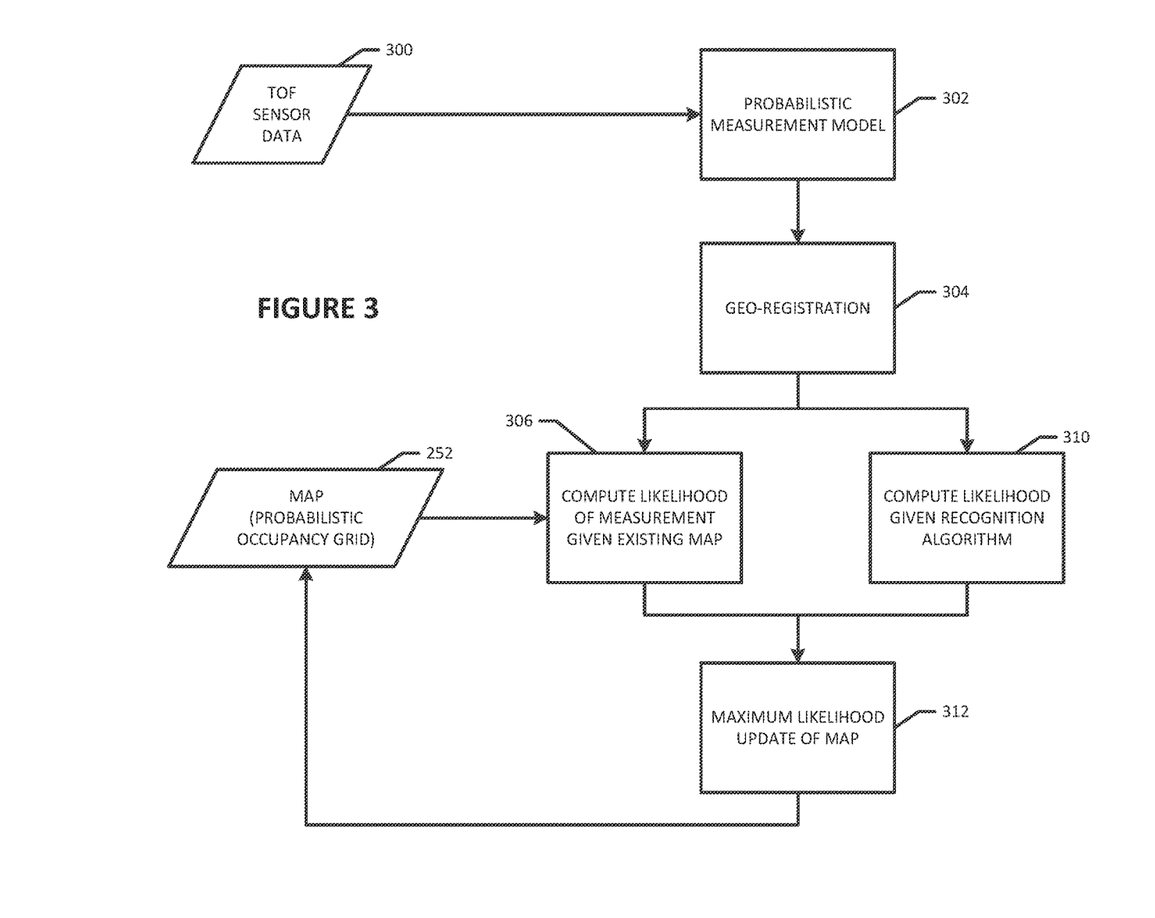
FIG. 3 is a diagram of a probabilistic MTA resolution process flow executed by the on-board computer system of FIG. 1 according to various embodiments of the present invention.

FIG. 3 is a flow chart of the probabilistic MTA resolution process that can be executed by the MTA resolution module 250 of the on-board computer system 103 according to various embodiments of the present invention. Block 300 represents the input data from the range sensor 202 (e.g., the lidar system 106). The range measurements from the range sensor are used to generate a probabilistic measurement model 302 as described above, and the points in that model can be georegistered at block 304. At block 306 the likelihood of the measurements can be computed based on the current map 252 (itself a probabilistic occupancy grid) and (when available) data from other sensing systems (such as the camera system 108, an IR sensing system, and/or the radar system 104). Also, at step 310 the likelihood of each point in the map can be computed using scan coherence recognition algorithms as described above. Based on both of these likelihoods (blocks 306 and 310), the maximum likelihood update to the current map can be computed at step 312 by the MTA probabilistic resolution module 250, with the updated map 252 to be used for the next iteration. The matched returns can also be used by the mapping and state estimation modules 116, 114 (see FIG. 1) in controlling the navigation of the vehicle.

If the passive probability distributions are not enough to disambiguate the MTA, the sensor can perform active sensing. The pulse rate, mirror angular rate, and vehicle flight pattern can be purposefully modified, for example, to maximize information gain in ambiguous regions. The pulse rate can be slowed such that the lidar (or other type of time-of-flight range sensor as the case may be) can unambiguously measure a difficult region. The physically plausible maximum range for returns can be controlled such that range modes can be eliminated or added. The vehicle can fly such that it views a region from a different angle or smaller distance, such that the region is observed sufficiently.

Figure 4:
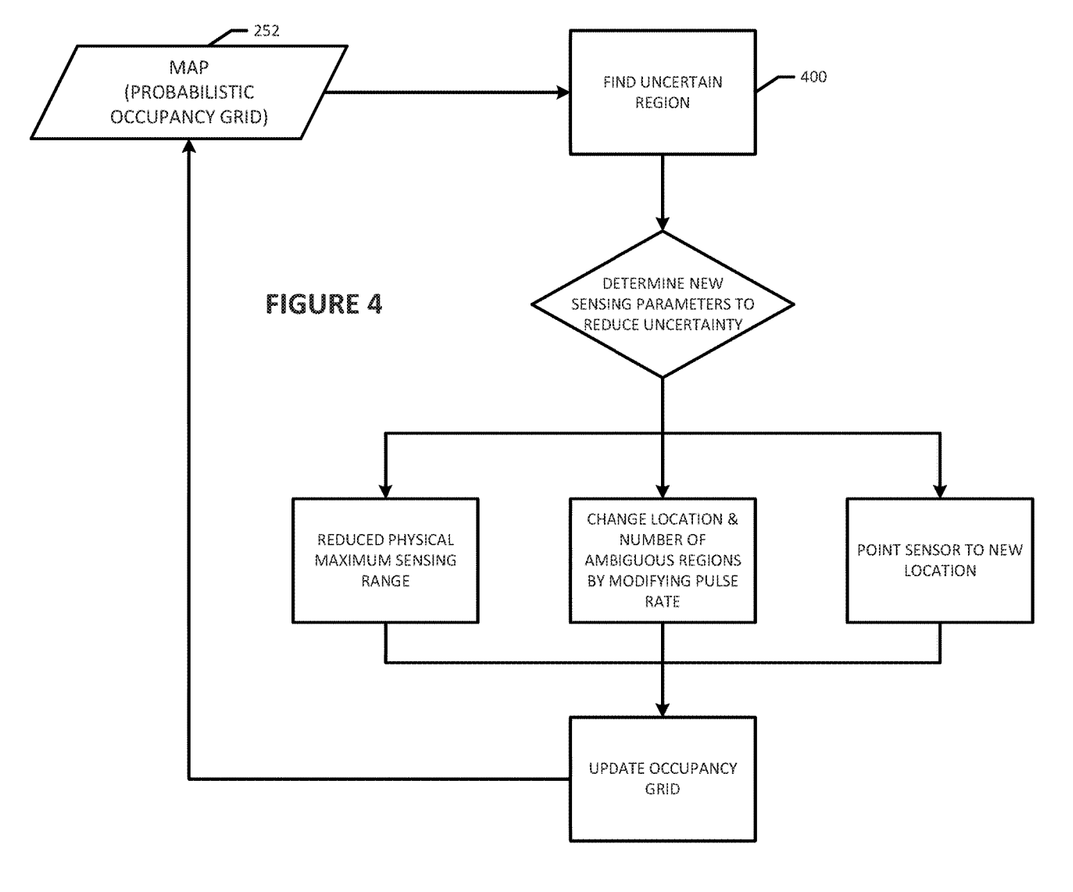
FIG. 4 is a diagram of a process flow for active sensing to disambiguate MTA according to various embodiments of the present invention.

An example of this process is shown in FIG. 4. This figure illustrates how the mirror angular rate, the pulse rate, and/or the pointing direction of the lidar sensor can be actively adjusted to acquire more complete data. For example, as shown in the example of FIG. 4, if at step 400, uncertain regions are detected in the current (probabilistic occupancy) map 252 (see FIG. 3), new sensing parameters for the range sensor can be determined at step 402 by the MTA ambiguity resolution module 250 to eliminate (or at least reduce) the uncertainty in the region. The new sensing parameters could include, as shown in the example of FIG. 4, reducing the physical maximum sensing range (i.e., steer the vehicle closer to the uncertainty region) 404, modifying the pulse rate 406, and/or changing the pointing direction of the range sensor 408 (e.g., point it toward the region of uncertainty). The range sensor data with the new sensing parameters can then be used to update the probabilistic occupancy grid 252, which is used by the other modules of the system (e.g., the object detection module 118 and/or flight planning module 122, etc.).

The probabilistic framework can also utilize measurement distributions from other sensors when available. For example, published U.S. patent application Pub. No. 2012/0257186, which is incorporated herein by reference in its entirety, describes a time of flight sensor that modulates its pulse rate to make smooth surfaces noisy for incorrect assignments of pulses to returns. This technique depends on having large, continuous smooth surfaces in the scene. The technique fails when the scene contains thin objects, like wires, or naturally noisy scenery like vegetation. Many applications, such as obstacle detection, demand accurate detection of wires and as such makes usage of the prior art inappropriate. The present invention naturally handles these difficult objects. It leaves their detection to later stages (i.e., the object detection module 118) that can recognize their structure. This increases measurement bandwidth available to the applications.

As mentioned above, the systems and method of the present invention could also be employed in a fixed, stationary apparatus. In such embodiments, the stationary apparatus comprises the time-of-flight ranging sensor as well as a computer system that is local or remote. The computer system may compute the PRR for the sensor and/or the updated map of the apparatus's surroundings as described herein.

In one general aspect, therefore, the present invention is directed to an apparatus that comprises a time-of-flight ranging sensor, such as the lidar system 106 or the radar system 104 of FIG. 1, that scans in two or more directions relative to the apparatus over a series of scanning cycles. The apparatus also comprises one or more computer processors, such as one of more processors of the on-board computer system 103, that are in communication with the time-of-flight ranging sensor. The one or more computer processors are programmed to compute, and to communicate to the time-of-flight ranging sensor, a pulse repetition rate (PRR) for the time-of-flight ranging sensor for each of the two or more directions. In particular, the one or more computer processors can compute the PRR based on information about surrounding terrain of the apparatus (e.g., the terrain map 204) and a sensor pointing schedule 206 for the time-of-flight ranging sensor that indicates directions that the time-of-flight ranging sensor is scheduled to point at time during the scanning cycles.

In various implementations, the PRR is computed by generating a schedule of expected ranges for the time-of-flight ranging sensor at times during the scanning cycles based on at least (i) the information about the surrounding terrain of the vehicle, (ii) the updated state of the vehicle, and (iii) the sensor pointing schedule, and then calculating a maximum PRR for the time-of-flight ranging sensor for the two or more directions at the times during the scanning cycles based on the expected ranges for the times.

In another general aspect, in addition to or in lieu of the computation of the PRR, the one or more processors are programmed to perform a scan coherence analysis on returns from pulses sensed by the time-of-flight ranging sensor to the pulses emitted by the time-of-flight ranging sensor to detect shapes indicative of objects in the surrounding environment of the apparatus; match the returns to the pulses probabilistically based on at least a current map of surrounding of the apparatus and the scan coherence analysis; and update the current map based on the probabilistically matched returns.

In various implementations, the apparatus comprises a vehicle, such as an aircraft, with the time-of-flight ranging sensor being on-board the vehicle. Also, the processor(s) of the on-board computer system can be programmed to determine an updated state of the vehicle as the vehicle moves. In that connection, the processor(s) could also be programmed to continuously update a map of a surrounding environment of the aircraft based on sensed returns from the time-of-flight ranging sensor and navigate the aircraft based in part on the continuously updated map. The two or more directions comprise a horizon direction for the aircraft and a ground-below direction for the aircraft.

In another general aspect, the present invention is directed to method comprises the step of scanning, by a time-of-flight ranging sensor 202, two or more directions relative to a vehicle over a series of scanning cycles, wherein the time-of-flight ranging sensor is on-board the vehicle, and wherein scanning comprises emitting pulses from the time-of-flight ranging sensor and sensed returns of the pulses reflected back to the time-of-flight ranging sensor. The method also comprises the step of computing, by an on-board computer system that is on-board the vehicle and in communication with the time-of-flight ranging sensor, the pulse repetition rate (PRR) for the time-of-flight ranging sensor for each of the two or more directions.

The processes associated with the present embodiments may be executed by programmable equipment, such as computers, such as the computer system 103 (whether on-board a vehicle or in a fixed apparatus). The on-board computer system 103 may comprise one or more computer devices, such as laptops, PCs, servers, etc. Where multiple computer devices are employed, they may be networked through wireless or wireless links, such as an Ethernet network. Each of the one or more computer devices of the computer system 103 comprises one or more processors and one or more memory units. The memory units may comprise software or instructions that are executed by the processor(s). The memory units that store the software/instructions that are executed by the processor may comprise primary computer memory, such as RAM. It may also be stored in secondary computer memory, such as diskettes, compact discs of both read-only and read/write varieties, optical disk drives, hard disk drives, solid state drives, or any other suitable form of secondary storage.

The modules described herein (e.g., the state estimation module 114, the mapping module 116, the object detection module 118, the flight planning module 122, the sensor directional point module 124, the autonomous flight control system module 126, and the Pulse Rate Planner module 200) may be implemented as software code stored in a memory unit(s) of the computer system 103 that is executed by the processor(s) of the computer system 103. The modules and other computer functions described herein may be implemented in computer software using any suitable computer programming language such as .NET, SQL, MySQL, HTML, C, C++, Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal, Haskell, ML; and examples of scripting languages include Bourne script, JavaScript, Python, Ruby, Lua, PHP, and Perl.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. Those of ordinary skill in the art will recognize that a sufficient understanding of the present invention can be gained by the present disclosure, and therefore, a more detailed description of such elements is not provided herein. Each of the individual embodiments described and/or illustrated herein has discrete components and features which may be readily separated from or combined with the features of any of the other several aspects without departing from the scope of the present disclosure. Any recited method can be carried out in the order of events recited or in any other order which is logically possible.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes," or "contains" one or more elements possesses those one or more elements, but is not limited to possessing only those one or more elements. Likewise, an element of a system, device, or apparatus that "comprises," "has," "includes," or "contains" one or more elements possesses those one or more elements, but is not limited to possessing only those one or more elements. Also, "based on" in the claims is opened-ended; something that is "based on" one consideration or item could be based on other considerations or items as well.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. An apparatus comprising:
a lidar sensor that scans in two or more directions relative to the apparatus over a series of scanning cycles; and
one or more computer processors in communication with the lidar sensor, wherein the one or more computer processors are programmed to:
compute a correspondence between pulses from the lidar sensor and sensed returns from the pulses using a map of a surrounding environment of the apparatus;
compute a time-varying pulse repetition rate (PRR) schedule for the lidar sensor for each of the two or more directions, wherein the one or more computer processors compute the PRR schedule based on information about surrounding terrain of the apparatus and a sensor pointing schedule for the lidar sensor that indicates directions that the lidar sensor is scheduled to point at times during the scanning cycles, wherein the lidar sensor is controlled according to the computed PRR schedule; and
continuously update the map of the surrounding environment based on the sensed returns from the pulses.

2. The apparatus of claim 1, wherein:
the apparatus comprises a vehicle;
the lidar sensor is on-board the vehicle; and
the one or more computer processors are programmed to determine an updated state of the vehicle as the vehicle moves.

3. The apparatus of claim 2, wherein the one or more computer processors compute the PRR schedule by performing steps that comprise:
generating a schedule of expected ranges for the lidar sensor at the times during the scanning cycles based on at least (i) the information about the surrounding terrain of the vehicle, (ii) the updated state of the vehicle, and (iii) the sensor pointing schedule; and
calculating a maximum PRR for the lidar sensor for the two or more directions at the times during the scanning cycles based on the expected ranges for the times.

4. The apparatus of claim 2, wherein the vehicle comprises an aircraft.

5. The apparatus of claim 4, wherein the one or more computer processors are further programmed to:
navigate the aircraft based in part on the continuously updated map.

6. The apparatus of claim 4, wherein the two or more directions comprise a horizon direction for the aircraft and a ground-below direction for the aircraft.

7. The apparatus of claim 1, wherein the one or more computer processors are further programmed to compute the correspondence between the pulses from the lidar sensor and the sensed returns from the pulses by:
performing a scan coherence analysis on the sensed returns from the pulses to the pulses from the lidar sensor to detect shapes indicative of objects in the surrounding environment of the apparatus; and
matching the sensed returns from the pulses to the pulses from the lidar sensor probabilistically based on at least the map of the surrounding environment of the apparatus and the scan coherence analysis.

8. The apparatus of claim 7, wherein:
the apparatus comprises a vehicle; and
the lidar sensor is on-board to the vehicle.

9. The apparatus of claim 1, wherein the map of the surrounding environment comprises a three-dimensional grid, wherein each cell in the grid indicates a likelihood that there is an object in the cell.

10. An aircraft comprising
a lidar sensor connected to the aircraft that emits pulses from the aircraft in two or more directions over a series of scanning cycles and senses reflected returns of the pulses, wherein the two or more directions comprise a forward-looking direction and a downward-looking direction; and
one or more computer processors that are on-board the aircraft and in communication with the lidar sensor, wherein the one or more computer processors are programmed to:
perform a scan coherence analysis on the returns from the pulses to detect shapes indicative of objects in a surrounding environment of the apparatus;
match the returns to the emitted pulses probabilistically based on at least a current map of the surrounding environment of the apparatus and the scan coherence analysis;
update the current map based on the probabilistically matched returns; and
navigate the aircraft based in part on the current map.

11. The aircraft of claim 10, wherein the current map comprises a three-dimensional grid, wherein each cell in the grid indicates a likelihood that there is an object in the cell.

* * * * *